May 15, 1962 E. E. DORKINS ETAL 3,034,587
QUICK COUPLING APPARATUS

Filed July 10, 1961 6 Sheets-Sheet 1

INVENTOR.
EVAN E. DORKINS &
BY PAUL D. GERNHARDT

Fishburn and Gold
ATTORNEYS

May 15, 1962 E. E. DORKINS ETAL 3,034,587
QUICK COUPLING APPARATUS
Filed July 10, 1961 6 Sheets-Sheet 2
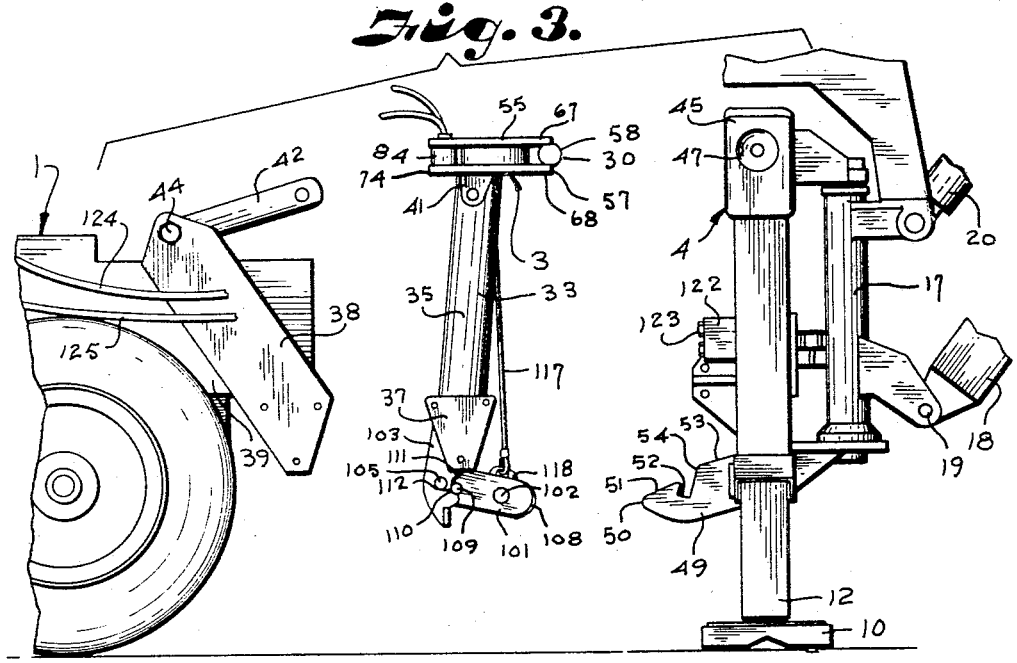
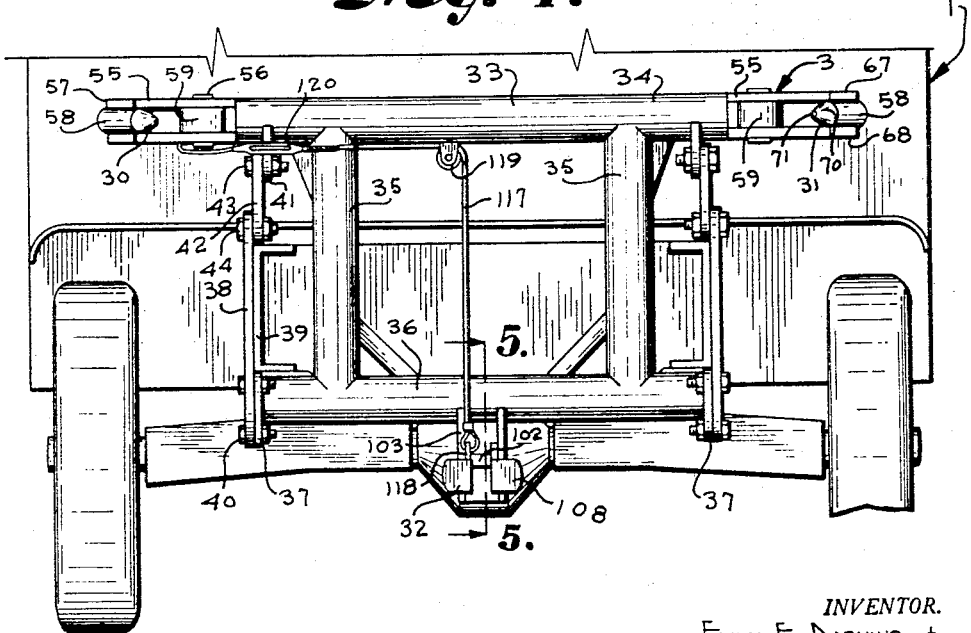
INVENTOR.
EVAN E. DORKINS &
BY PAUL D. GERNHARDT
Fishburn and Gold
ATTORNEYS May 15, 1962   E. E. DORKINS ETAL   3,034,587
QUICK COUPLING APPARATUS
Filed July 10, 1961   6 Sheets-Sheet 3
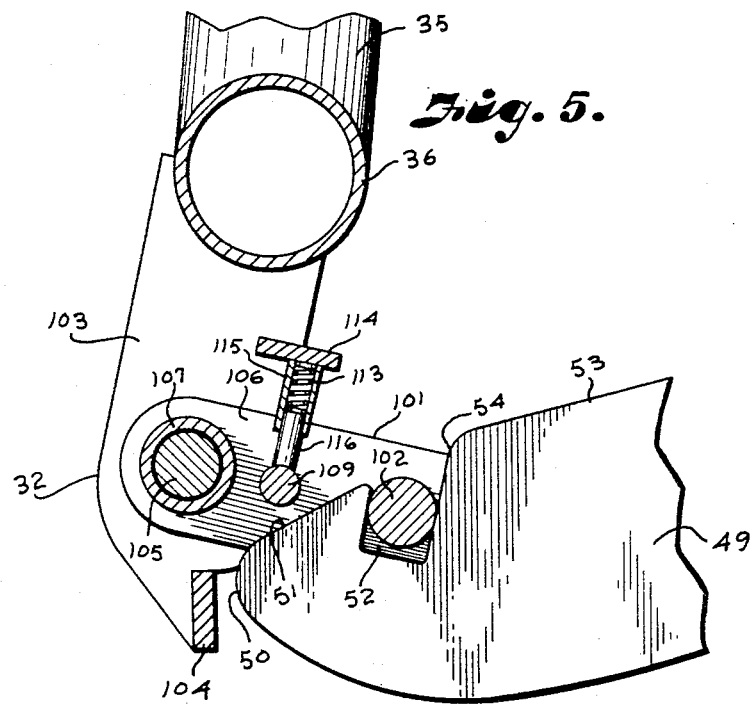
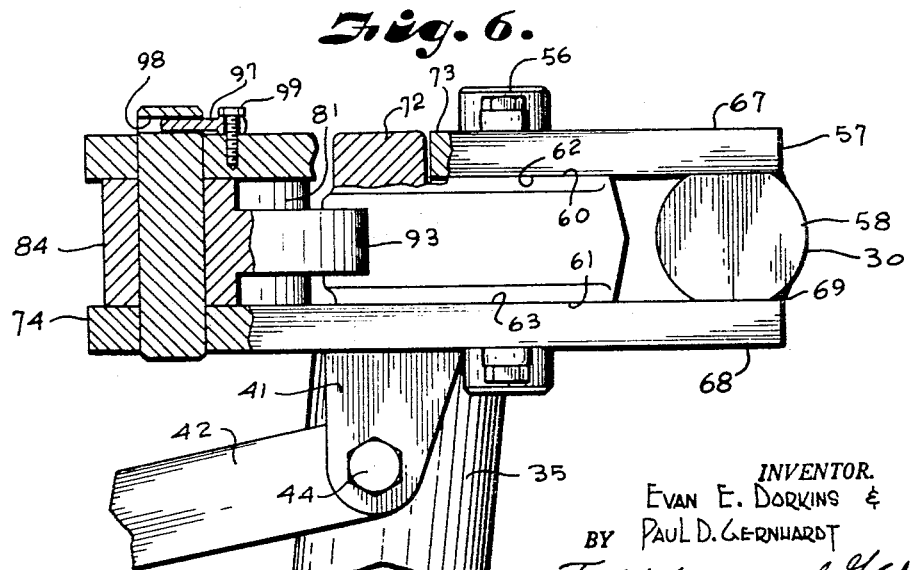
INVENTOR.
Evan E. Dorkins &
BY Paul D. Gernhardt
Fishburn and Gold
ATTORNEYS

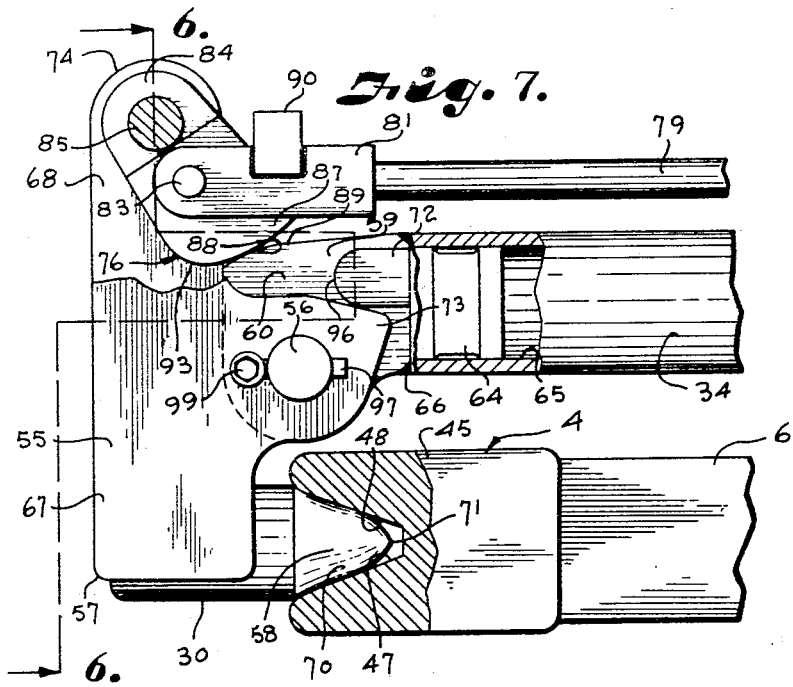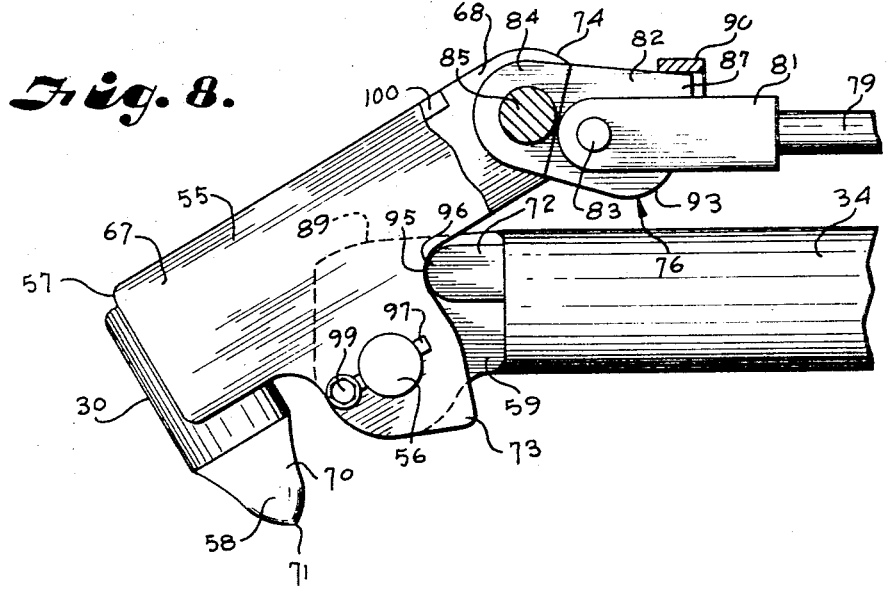

May 15, 1962 E. E. DORKINS ETAL 3,034,587
QUICK COUPLING APPARATUS
Filed July 10, 1961 6 Sheets-Sheet 5

INVENTOR.
EVAN E. DORKINS &
BY PAUL D. GERNHARDT

Fishburn and Gold
ATTORNEYS

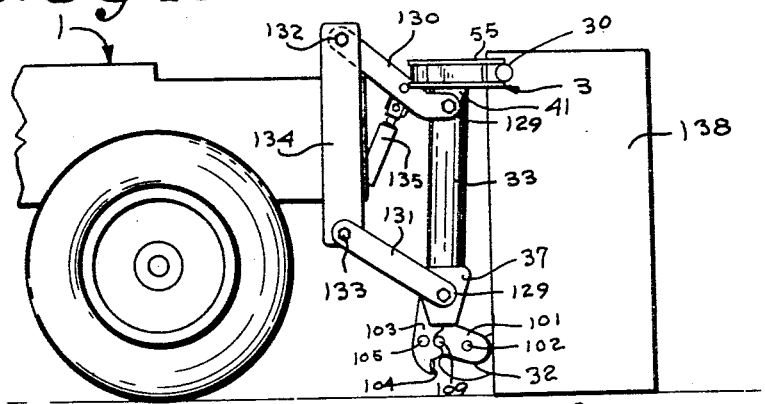
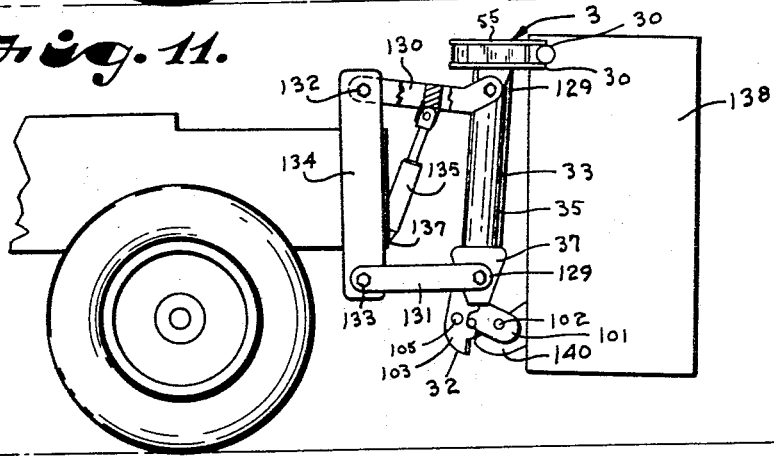
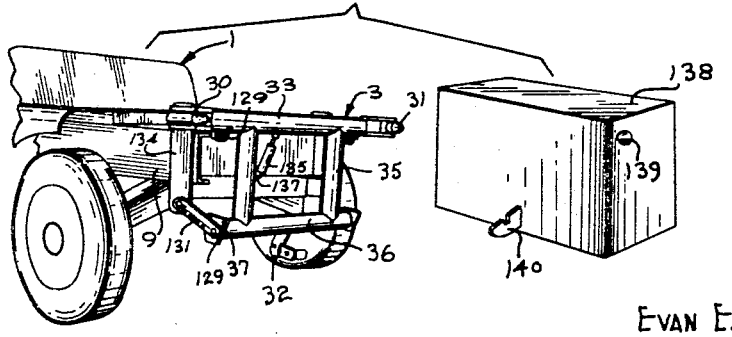

United States Patent Office 3,034,587
Patented May 15, 1962

3,034,587
QUICK COUPLING APPARATUS
Evan E. Dorkins, Ottawa, and Paul D. Gernhardt, Overland Park, Kans., assignors to Young Spring & Wire Corporation, Detroit, Mich., a corporation of Michigan
Filed July 10, 1961, Ser. No. 122,702
18 Claims. (Cl. 172—274)

This invention relates to vehicle mounted equipment, and more particularly to hitching or coupling apparatus for selectively connecting structures such as material handling apparatus and other devices to mobile vehicles for positive movement thereby. This invention, while intended for general use, is especially well adapted as a quick hitch for connecting counterbalances and other devices and material handling apparatus such as backhoes and the like having movable booms, arms and supports to mobile vehicles for positive or bodily movement or positioning during operation with said hitch releasable for disconnecting the vehicle from said apparatus whereby the apparatus may be left at a selected place and the vehicle used for other purposes.

The principal objects of the present invention are to provide a new and improved structure for separably coupling equipment to mobile vehicles for bodily movement therewith; to provide such a structure for coupling a vehicle and equipment to be positively moved thereby with spaced operable members on one engageable with portions of the other for securing the vehicle and equipment together; a provide such a structure with cooperating frame portions on the vehicle and equipment and spaced operable members on one engageable with portions of the other for securing said frames one relative to the other; to provide such a structure with the operable members being swingable on the frame on the vehicle and actuated by extensible members; to provide an articulated structure between the extensible members and arms with cooperating cam surfaces for frictionally locking the structure in position for connecting said frames or portions whereby forces on the equipment tending to move said arms increases the forces holding the cam surfaces in locked position and the arms are disengageable only by retractive movement of the extensible members; to provide such a structure wherein the hitch portions on the vehicle and/or the equipment are arranged or mounted for relative vertical movement to a position wherein the coupling portions of one are engageable with the coupling portions of the other; to provide such a structure wherein certain coupling portions have cooperating inclined walls whereby the coupling portions of one are received into the coupling portions of the other even with misalignment within limits; to provide such a structure wherein the coupling movement of the portions moves the parts into alignment and forms a connection thereof; to provide such a structure for supporting equipment on a vehicle wherein the equipment, for example a backhoe, has movable legs and arms for engaging the ground or like supporting surface and are operable to vary the relative elevation of the frame hitch portions thereof for approximate positioning for reception of cooperating hitch portions on the frame on the vehicle; to provide a coupling and mounting structure for connecting the vehicle and equipment with the connecting points having relative positions whereby locking engagement of the structure at one point is responsive to movement of one of the arms forming a cooperative part of the coupling at another point; to provide a three-point coupling and mounting with two points substantially at the same elevation and a third point at a different elevation and arranged whereby the weight of the equipment relative to the coupling point tends to effect relative movement and automatic coupling at the third point; to provide such a structure with a latch for retaining the third point of coupling secured with the latch operatively connected to at least one of the coupling members of the other two coupling points whereby disengagement of the coupling portions at said other two points effects disengagement of the latch at the third point of connection; to provide such a structure wherein the coupling portions on the vehicle are movably supported thereon and have operable members to selectively position said coupling portions at desired elevations relative to the vehicle; and to provide a quick hitch or coupling for connecting equipment to a vehicle for positive movement thereby that is capable of continuous hard usage with the release effected only under control of the operator and that is efficient in operation whereby various equipment may be connected to the vehicle or disconnected and set aside while the vehicle is used for other purposes.

Other objects and advantages of this invention will become apparent from the following description taken in connection with the accompanying drawings wherein are set forth by way of illustration and example certain embodiments of this invention.

FIG. 3 is a partial side elevation of a vehicle and the coupling portions and carrying frames in spaced disassembled relation.

FIG. 4 is a rear elevation of the vehicle with the coupling carrying frame thereon.

FIG. 5 is an enlarged sectional view through the lower coupling members and latch.

FIG. 6 is a side elevation of the upper portion of a coupling member carried by the vehicle with portions broken away on the line 6—6, FIG. 7, to illustrate the structure thereof.

FIG. 7 is a top view of one of the upper coupling portions in engaged position with portions broken away to illustrate the structure thereof.

FIG. 8 is a top view of one of the upper coupling portions carried on the vehicle in disengaged position.

FIG. 10 is a partial side elevation of a vehicle with a coupling unit movably mounted thereon for change in elevation and coupled to a device to be moved by the vehicle.

FIG. 11 is a partial side elevational view of the vehicle and device carried thereon in coupled relation similar to FIG. 10 only with the device in elevated relation.

FIG. 12 is a perspective view of the coupling member on the vehicle with the device to be coupled in spaced relation thereto.

Figure 1:
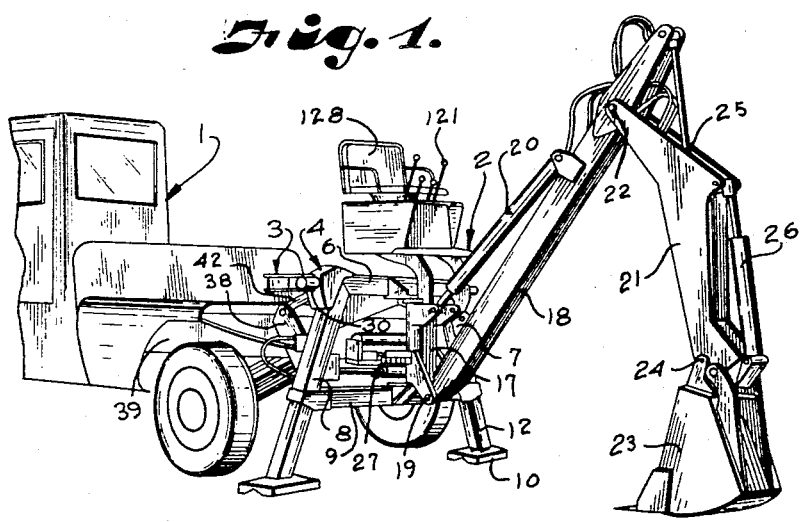
FIG. 1 is a perspective view of a material handling unit coupled to a vehicle by a hitch embodying the features of the present invention.
Figure 2:
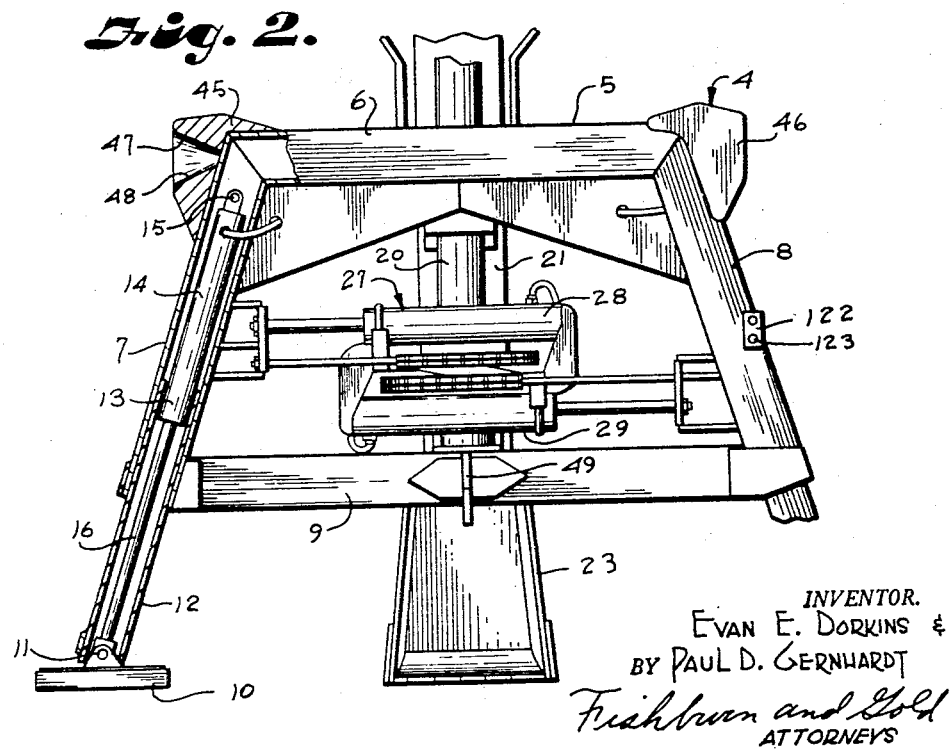
FIG. 2 is an elevational view of a backhoe with a portion of the frame having coupling portions thereon broken away to illustrate the structure thereof and an elevating leg of a backhoe frame.

Referring more in detail to the drawings:

1 generally designates a vehicle adapted to be connected to and carry devices or equipment 2, the vehicle preferably being of a type having a source of fluid pressure with controls for selective actuation of hydraulic operators, rams or the like. Separable cooperating coupling parts or structures 3 and 4 are suitably carried or arranged on the vehicle 1 and equipment or device 2 respectively, with the coupling mountings being arranged for selective relative elevational movement, particularly for effecting approximate elevational alignment of cooperating portions of the coupling structures while disengaged one from the other. In the structure illustrated in FIGS. 1 to 9 inclusive, the equipment 2 to be carried by the vehicle is material handling apparatus as, for example, a backhoe. In the structure illustrated, the equipment has a frame 5 which carries the coupling structure or apparatus 4, the frame 5 being generally an A-frame having a top member 6 terminating in outwardly and downwardly inclined legs or side members 7 and 8 which are connected at their lower ends by a cross member 9, each of said members of the A-frame in the illustrated structure being of box form in cross section. Stabilizing foot plates 10 are pivotally mounted as at 11 on the lower end of slide members 12 which are slidably mounted in telescopic relation in the legs 7 and 8, with hydraulic rams 13 positioned inside each set of legs and slide members with the cylinder 14 thereof connected as at 15 to the A-frame and the piston rod 16 extending therefrom and suitably connected to the slide member whereby extension of the ram moves the foot plates 10 downwardly and contraction of the rams moves the foot plates upwardly relative to the A-frame 5, the rams being of such power that when the structure is in operation the weight of the rear of the vehicle 1 is carried by the foot plates 10 to stabilize the structure.

A mast 17 is rotatably mounted on the A-frame for movement on a generally vertical axis and the lower end of a boom 18 is pivotally mounted as at 19 on said mast and adapted to be swung up and down relative thereto by means of a hydraulic ram 20. A dipper arm 21 has one end pivotally mounted as at 22 on the upper or outer end portion of the boom and a bucket 23 is pivotally mounted as at 24 on the other end of the dipper arm, the dipper arm being swingable relative to the boom by means of a hydraulic ram 25 and the bucket being swingable relative to the dipper arm by means of a hydraulic ram 26. The mast 17 is rotated by means of rotating mechanism 27 including hydraulic rams 28 and 29 operatively connected with the mast to effect rotation thereof in response to extension and contraction of the rams 28 and 29.

The backhoe illustrated and described is exemplary only of equipment adapted to be coupled and positively moved by the vehicle with members operable for varying the elevation of the coupling portions or apparatus carried by the implement or device and cooperable with the coupling apparatus carried by the vehicle for releasably coupling or mounting of the implement or device on the vehicle.

The coupling apparatus 3 is adapted to be carried or mounted on the vehicle and, in the illustrated structure, it is fixed on the rear end of the vehicle, as later described. The coupling apparatus 3, in the illustrated structure, has three connector members 30, 31 and 32 carried on a support 33 which is preferably in the form of a frame having a top member 34, spaced upright members 35 and a bottom member 36, all suitably connected together to form a rigid structure. Said members are preferably tubular with the top member 34 and bottom member 36 extending transversely relative to the vehicle. The bottom member 36 has end plates 37 secured thereto and adapted to engage a mounting plate 38 on each side of the frame 39 of the vehicle and be secured to the lower portion thereof by suitable fastening devices such as bolts 40. The top member 34 of the coupling support preferably has depending ears 41 which are secured to one end of a link 42 by suitable fastening devices 43, such as bolts. The other end of the link 42 is secured relative to the frame of the vehicle by suitable fastening devices 44 which, in the illustrated structure, the link is secured to the upper end portion of the mounting plates 38 to complete a positive mounting of the coupling apparatus 3 relative to the frame 39 of the vehicle 1. It is preferable that the vertical members 35 of the support 34 be inclined upwardly and rearwardly at a small angle substantially as illustrated in FIG. 3.

The connector members 30 and 31 are preferably arranged adjacent the upper portion of the support 33 and are adapted to engage cooperating members 45 and 46 of the coupling apparatus 4 which, in the illustrated structure, include portions fixed on the A-frame 5 at the upper ends of the side members 7 and 8 and having outwardly opening sockets 47 with angularly arranged converging faces 48 preferably forming substantially conical recesses or sockets opening outwardly to the side of the A-frame. The A-frame also has a third coupling or connecting member 49 which, in the illustrated structure, is secured to the lower A-frame member 9 and consists of a plate extending toward the vehicle and terminating in a small rounded end 50 with an upper surface 51 inclined upwardly toward the A-frame and terminating in a downward extending notch or recess 52 the sides of which are preferably slightly converging and inclined downwardly away from the A-frame for a wedging action on a member to be received therein. The upper edge between the notch and the A-frame as at 53 is on a plane above the plane of the surface 51 to form a shoulder 54 at the edge defining the notch toward the A-frame, as illustrated in FIG. 3. While the members 4 and 49 are shown on the A-frame of the backhoe, it is to be understood that said members may be fixed on any device to be coupled and carried by the vehicle wherein said members are connected or fixed relative to each other to maintain their relative positions with the connecting member 49 below the line of the sockets 47 and the axes of the sockets 47 being on a single line extending transversely of the vehicle when coupled thereto.

Figure 9:
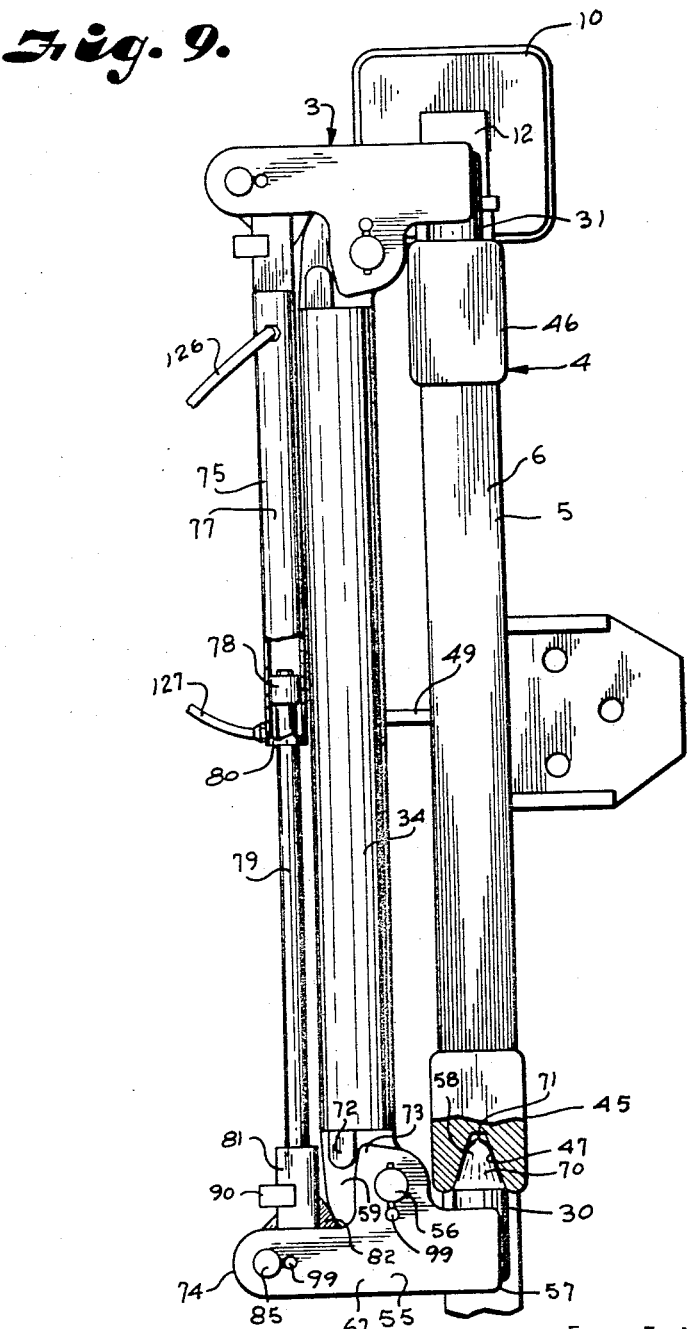
FIG. 9 is a top view of the upper coupling members in engaged position with portions broken away to illustrate the structure thereof.

The cooperative coupling structure 3 has the coupling portions or jaws 30 and 31 adapted to engage the coupling members 45 and 46 respectively to secure the upper part of the coupling structure 4 relative to the coupling structure 3. The coupling portions 30 and 31 are movably mounted on the coupling structure 3 to effect engagement and disengagement of said coupling portions 30 and 31 with the coupling members 45 and 46. In the illustrated structure, the coupling portions 30 and 31 include arms 55 that are pivotally mounted on the coupling structure 3, preferably adjacent the end portions of the top member 34 of the frame 33 by means of pivot pins 56 with one end 57 of each arm extending away from the vehicle and carrying projections 58 to engage in the sockets 47. The mounting members or portions 59 at the outer end of the top member 34 each have spaced parallel faces 60 and 61 substantially engaging cooperating faces 62 and 63 respectively of the respective arm 55 to limit movement of the arm axially of the pivot pin 56 and, in the structure illustrated, the end members 59 each have a shank 64 extending into the end of the bore 65 of the top member 34 and are secured thereto as by welding as at 66, with the faces 60 and 61 in horizontal planes when the vehicle is resting on a horizontal surface. The arms 55 are each preferably formed of spaced plates 67 and 68 with the end portions 57 extending in a direction opposite from the vehicle with the coupling projections 58 secured to the plates of the respective arms as by welding as at 69 with end portions or noses of the projections extending toward each other when in coupling position, as illustrated in FIG. 9. The noses of the projections 58 have inclined faces 70 cooperating with the inclined faces of the sockets 47 to effect alignment thereof with those portions preferably being substantially conical with a relatively pointed end 71 whereby the ends will enter into the sockets when there is a misalignment of the axes of the nose ends 71 and the sockets of slightly less than one-half the diameter of the large portion or opening of the sockets, and further movement of the nose portions of the projections 58 into the respective sockets will move the coupling apparatus 4 to position the two socket portions thereof coaxial with the axes of the projections 58 and clamped in between the coupling portions 30 and 31 with a wedge action to securely hold the coupling apparatus 4 at the upper portion thereof against longitudinal or transverse movement relative to the coupling portions 30 and 31. It is preferred that the pivot pins 56 have their axes substantially in the plane of engagement of the large portions of the projection noses in the large portions of the sockets when in coupled position, as illustrated in FIG. 9, and abutment members 72 are arranged on the frame 33 or end portions 59 for engagement with stop portions 73 on the arms 55 when the nose portion of the projections 58 of the coupling members 30 and 31 at one side of the coupling apparatus engages in the respective socket to limit further movement thereof until the nose portion of the other projection engages in its respective socket. If the nose portions engage in the respective sockets simultaneously and thereby center the coupling apparatus 4 relative to the coupling apparatus 3, the stop portions 73 remain slightly spaced from the abutments 72, as illustrated in FIG. 9.

The other ends 74 of the arms 55 extend from the pivot pins 56 oppositely from the projections 58 and said other ends are operatively connected to an extensible member 75 arranged whereby extension of the extensible member moves the coupling members 30 and 31 into coupling position and contraction of the extensible member 75 moves the coupling members 30 and 31 to uncoupled position. A lock structure 76 is provided for each arm 55 to lock said arms in coupling engagement relative to the coupling apparatus 4, said locks being operated or actuated by the arm-moving device or structure. In the illustrated structure, the extensible member 75 is in the form of an hydraulic ram having a cylinder 77 with a piston 78 reciprocable therein and connected to a piston rod 79 extending through an end 80 of the cylinder with the other end of the cylinder and the end of the piston rod remote from the cylinder having bifurcated end members 81 or clevis-like structures which straddle portions of lock arms or members 82 and are pivotally connected thereto by pivot pins 83. The lock arms or levers 82 each have an end portion 84 pivotally mounted by a pivot pin 85 to the end portions 74 of the respective arms 55. The other end portions 87 of said lock arms or levers 82 extend from the pivot pins 83 and have surfaces 88 adapted to engage a cooperating locking surface 89 carried by the frame 33 and, in the illustrated structure, the surfaces 89 are on the end portions 59 and the pivot pins 83 are intermediate the pivot pins 85 and the surfaces 88 of the lock arms 82. With this arrangement, the lock arms 82 form links between the extensible member 75 and the arms 55 and, in contracting of the extensible members 75, the force applied thereby to the pivot pin 83 tends to swing the lock arms or links 82 whereby the planes defined by the axes of the pivot pins 83 tends to move toward the plane defined by the pivot pins 85. However, such movement is limited by stops 90 on the end members 81 which are engaged by the end portions 87 of the links 82, as illustrated in FIG. 8, whereby the axes of the pins 83 are always spaced from the plane defined by the axes of the pins 85 in a direction toward the plane defined by the axes of the pivot pins 56, and upon extension of the extensible member 75 there is a moment of force applied to the links 82 tending to rotate same to move the end portion 87 thereof toward the frame 33 or toward the plane defined by the axes of the pins 56. However, while there is no engagement of the coupling members 30 and 31 with any obstruction and the arms 55 are relatively free to swing, the links 82 will merely move to engage a rounded portion 93 thereof with the end portions of the top member 34 whereby they will merely ride thereon until the coupling members 30 and 31 approach coupling position. In the illustrated structure, the surface 89 is substantially on a radius from the axis of the pins 56. The respective cooperating locking surface on the end 87 of the respective link 82 is formed as a continuation of the rounded portion 93 with a surface 88 being of progressively greater distance from the axis of the pivot pin 85 to the opposite end of the surface 88. These cooperating surfaces 89 and 88 and the respective positioning of the pins 56 and 85 are such that as the nose portions of the coupling members 30 and 31 engage in the sockets 45 and 46 of the other coupling apparatus 4 to positively couple the upper portions of the coupling apparatus 3 and 4, the engagement of the inclined surfaces is completed and forms a stop against further movement of the arms 55 and continued extension of the extensible member 75 then tends to swing the respective link 82 to provide an interference type engagement between the respective surfaces 88 and 89 forming a frictional lock or wedging to hold the arms 55 against retractive movement of the coupling members 30 and 31. The surfaces 88 and 89 are so positioned that when such locking engagement is obtained the axis of the pivot pin 83 is on the side toward the cylinder 77 relative to the respective planes defind by the pivot pins 56 and 85 and, even after wear, the axes of the pins 83 never go beyond center of said plane. With this arrangement, when the coupling apparatus is in coupling position, forces exerted by the coupling member 4 tending to swing one of the arms 55 outwardly or laterally merely tightens the locking engagement of the faces 88 and 89, and such force will not release the lock and coupling engagement even if the pressure in the extensible member cylinder 77 should bleed off to zero. However, positive pressure in the cylinder 77 to contract the extensible member 75 swings the links 82, disengaging the surfaces 88 and 89, and then continued contractive movement of the extensible member will easily swing the arms 55 to uncoupled position. A stop is provided to limit the movement of the arms 55 and, in the illustrated structure, a portion 95 of the arm engages the end 96 of the abutment member 72.

Each of the pivot pins 56 and 85 is suitably retained in assembled position by keepers which, in the illustrated structure, are in the form of a key 97 engaged in an aperture 98 in the respective pin with the keeper or key secured by suitable fastening device 99 such as a screw to the arms 55. Also, for the increased rigidity and strength, the plates 67 and 68 of the arms 55 are connected as by welding to a web member 100 that extends from adjacent the link 82 to the projections 58.

The lower coupling portion or latch 32 has a member 101 swingable relative to the frame 33 with a keeper bar 102 adapted to engage in the notch 52 in the member 49. In the illustrated structure, spaced bracket plates 103 are fixed in depending relation to the lower bar or member 36 of the frame 33 generally midway between the ends of the coupling apparatus 3. The lower ends of the bracket members 103 are connected by a cross bar 104 for increased rigidity. The member 101 is pivotally mounted for up and down swinging movement on a bearing pin 105 supported in the bracket members 103 and extending therebetween above the bar 104, the member 101 extending outwardly away from the vehicle with the keeper bar 102 spaced therefrom whereby normally it will engage in the notch 52 with a slight wedging action while the end 50 of the member 49 is slightly spaced from the bar 104. The latch member 101 preferably consists of laterally spaced plates 106 connected by a bearing member 107 that is rotatably mounted on the pivot pin 105. The keeper bar 102 is fixed to the plates 106 and extends therebetween and the end portions remote from the bearing portion 107 beyond the bar 102 are flared outwardly in diverging relation as at 108 to form a wide entrance passage for the member 49 between the latch plates 106. A bar 109 extends between the plates 106 and laterally outwardly on each side thereof and is arranged for movement in a cut-away portion 110 in the bracket plates 103, the ends of the cut-away portion forming stops 111 and 112 to limit the extent of swinging movement of the latch member, particularly in the downward direction whereby it is supported in a position that when the coupling members 30 and 31 are engaged with the members 45 and 46 respectively the end portion 50 will be below the keeper bar 102 and swinging movement of the coupling portion 4 toward the coupling portion 3 will cause the inclined surface 51 to engage the keeper bar 102 automatically lifting the latch whereby upon further movement the keeper bar will drop into the slot 52 and, on fast movement, the upper portion of the shoulder 54 will prevent the member 49 from moving beyond position to be latched by the keeper bar 102 entering the notch 52. The relative positioning of the coupling portions 45 and 46 and the notch 52 in the member 49 is such that when the coupling members 30 and 31 are engaged with the coupling portions 45 and 46, the weight of the equipment having the coupling apparatus 4 thereon tends to swing downwardly about the axes of the projections 58 and effect automatic latching of the latch member with the member 49. In order to provide resistance to accidental movement of the latch member from engagement with the member 49, a spring 113 biases the latch member 101 downwardly. In the illustrated structure, there is a bar 114 fixed to the bracket members 103 and extending therebetween, said bar carrying a sleeve 115 in which the spring 113 is movable with one end of the spring bearing against the bar 114 and the other end against a plunger 116 which engages the bar 109 to maintain spring pressure thereagainst. The latch member is moved to uncoupled position by any suitable means, but it is preferred that it be automatic or responsive to operation of the upper coupling portions. In the illustrated structure, an elongate flexible member such as a wire rope 117 has one end secured to an eye 118 on the latch member 101 with said rope extending upwardly and over a pulley 119 suitably supported in depending relation to the top member 34 of the frame. The other end of the rope is preferably connected by an adjustable member 120, such as a turnbuckle, to one of the arms 55 whereby outward swinging movement of the respective arm toward an uncoupled position will apply force to the rope 117 and raise the latch member 101. It is preferred that the connection between the arm 55 and the rope 117 be a lost motion type or that there be looseness in the rope whereby upon coupling action of the apparatus the latch member will be lowered approximately when the arms 55 start their inward swinging movement to coupling position and that the latch member will be released from coupling position as the arms 55 near the limit of their uncoupled position.

In the structure illustrated, the implement has control valves for the respective hydraulic rams, said control valves being actuated by a group of levers 121, and the control valves being supplied by fluid pressure conduits leading to a connector structure 122 mounted on one of the side members of the A-frame with said connector 122 having portions of quick connector couplings 123 whereby a line 124 from the source of fluid pressure and a return line 125 may be connected to the implement hydraulic system for selective operation of the various hydraulic rams thereon. The extensible member 75 is connected by fluid conduits 126 and 127 to a controlled fluid pressure supply (not shown) for selective application of pressure to the ends of the cylinder 77 to effect extension and contraction thereof.

In operating an apparatus constructed and assembled as described, and with the implement arranged with the outrigger supports or legs 12 extended, and the bucket 23 on the ground to cooperate with the outriggers in supporting the implement while it is idle, the coupling of the implement to a vehicle 1 is started by moving the vehicle toward the implement whereby the coupling portions 45 and 46 of the coupling apparatus 4 are generally positioned between the coupling members 30 and 31. The lines 124 and 125 are then connected to the connector box 122 and an operator moves to a seat 128 on the implement and actuates one of the valve levers 121 for the respective rams 14 to adjust the elevation of the coupling portions 45 and 46 whereby they are generally on the same elevation as the coupling members 30 and 31. Then fluid pressure is applied to the extensible member 75 to extend same, swinging the arms 55 to move the coupling members 30 and 31 whereby the noses thereof enter the coupling sockets 47 of the coupling portions 45 and 46. As they move into such engagement, the links 82 swing toward the top member 34 and, if the coupling apparatus 4 is slightly to one side of center, the coupling member 30 or 31 entering same will center therein and continue movement until the stop member 73 of the arm engages the abutment 72. This will stop movement of the respective arm and the force of the extensible member will then be applied to the other arm, effecting further swinging movement of same until the respective coupling portion thereon engages in its respective socket in the coupling apparatus 4. Then further extension of the extensible member moves the links 82 whereby the cam interference surface 88 thereon frictionally and wedgingly engages the surface 89 of the end member 59, positively locking the arms against retractive swinging movement. Then the operator can actuate the respective valve handle of the group 121 to lift the outrigger feet 10 from the surface whereby the A-frame or coupling apparatus 4 is primarily supported on the coupling members 30 and 31, and then gravitational movement will swing the lower portion of the coupling apparatus 4 toward the lower portion of the coupling apparatus 3 whereby the member 49 will enter between the diverging portions of the latch plates 101 and cause said latch to rise upwardly on the surface 51 until the bar 102 engages in the notch 52 to effect positive latching action of the lower portions of the coupling apparatus. The spring 113 biases the latch portion downwardly to maintain the latch engaged with the member 49. The operator then moves to the seat 128 and actuates valve levers 121 to cause the respective hydraulic rams to move the portions of the implement upwardly whereby it is in position for transportation. The vehicle may then be driven to a desired site for work and the implement used in a conventional manner.

When it is desired to uncouple the implement from the vehicle, the operator actuates selected valve levers 121 to move the bucket 23 into the ground and the legs 12 downwardly to engage the foot plates 10 with the ground, the respective arrangement being such that when uncoupled the implement will remain supported on the ground. Pressure is then applied to the cylinder 77 to contract the extensible member 75 to pull the links 82 whereby the surfaces 88 and 89 of the locks are disengaged and further movement will swing the arms 55 into uncoupled position. During this movement of the arms, the rope 117 is placed under tension and moved to raise the latch member to disengage the latch bar 102 from the notch 52. Then the vehicle may be driven away from the implement, the uncoupling being completed.

In the form of the invention illustrated in FIGS. 10 to 12 inclusive, the coupling apparatus 3 is the same as that illustrated and described relative to the form shown in FIGS. 1 to 9 inclusive, but it is mounted on the vehicle whereby it can be elevated relative to the ground or supporting surface. In the structure illustrated, the frame 33 is pivotally connected at each side and at vertically spaced points to ends 129 of pairs of parallel arms 130 and 131, the other ends of said arms being connected as at 132 and 133 to bracket members 134 carried by the vehicle 1. In order to effect elevation of the coupling apparatus, an extensible member 135 is provided on the vehicle. In the structure illustrated, the hydraulic ram has one end mounted on the vehicle as at 137 and the other end connected to a pair of cross links or members whereby extension of the extensible member swings the parallel arms upwardly to elevate the coupling apparatus 3 and contraction of the ram or extensible member lowers the coupling apparatus relative to the support of the vehicle. This arrangement is particularly adaptable to effect elevational alignment of the coupling portions on the apparatus 3 with the coupling portions on the apparatus 4 without changing the elevation of the coupling apparatus 4. It is also adapted to effect coupling with devices not having separate elevation means. While any such device may be accommodated, in the illustrated structure a counterweight 138 is shown for exemplary purposes only, said counterweight 138 having opposed conical shaped sockets 139 for receiving the noses of the coupling members 30 and 31 and also having a latch plate 140 extending therefrom for engagement with the latch member of the coupling apparatus 3. The operation of the coupling apparatus shown in FIGS. 10 to 12 inclusive is the same as that described for the forms shown in FIGS. 1 to 9 inclusive with the exception that the coupling apparatus 3 is elevated and lowered to provide for general alignment of the coupling portions of the coupling members.

It is to be understood that while we have illustrated and described certain forms of our invention, it is not to be limited to the specific forms or arrangements of parts herein described and shown except insofar as such limitations are included in the claims.

What we claim and desire to secure by Letters Patent is:

1. A coupling device comprising, cooperating parts for operatively connecting equipment devices with a vehicle wherein one of said cooperating parts is carried on a vehicle, one of said parts including a rigid structure having opposed sockets arranged in axial alignment and opening outwardly of said structure, the other of said cooperating parts including a frame, spaced jaws each having socket-engaging portions on an end thereof, means pivotally mounting said jaws on said frame in spaced relation to each other and with the socket-engaging portions extending therefrom toward said one cooperating part for swinging movement of said jaws to move the socket-engaging portions toward and away from each other, arms on said jaws and extending from the pivotal mounting thereof oppositely to said socket-engaging portions, an extensible means operatively connected to said arms whereby extension and contraction of the extensible means swings the jaws between the coupling and uncoupling positions, and means carried by said jaws and operatively responsive to extension and contraction of said extensible means to engage coacting means on said frame whereby to lock the jaws against retractive movement when the socket-engaging portions are engaged in said sockets.

2. A coupling device comprising, cooperating parts for operatively connecting equipment devices with a vehicle wherein one of said cooperating parts is carried on a vehicle, one of said parts including a rigid structure having opposed sockets arranged in axial alignment and opening outwardly of said structure, the other of said cooperating parts including a frame, spaced jaws each having socket-engaging portions on an end thereof, means pivotally mounting said jaws on said frame in spaced relation to each other and with the socket-engaging portions extending therefrom toward said one cooperating part for swinging movement of said jaws to move the socket-engaging portions toward and away from each other, arms on said jaws and extending from the pivotal mounting thereof oppositely to said socket-engaging portions, links pivotally connected to said arms, an extensible means having ends pivotally connected to said links whereby extension and contraction of the extensible means swings the jaws between the coupling and uncoupling positions, and cooperative means on said frame and said links engageable to frictionally lock the jaws against retractive movement when the socket-engaging portions are engaged in the respective sockets.

3. A coupling device comprising, cooperating parts for operatively connecting equipment devices with a vehicle wherein one of said cooperating parts is carried on a vehicle, one of said parts including a rigid structure having opposed sockets arranged in axial alignment and opening outwardly of said structure, a connector member fixed relative to said rigid structure and vertically spaced from the axis thereof, the other of said cooperating parts including a frame, spaced jaws each having socket-engaging portions on an end thereof, means pivotally mounting said jaws on said frame in spaced relation to each other and with the socket-engaging portions extending therefrom toward said one cooperating part for swinging movement of said jaws to move the socket-engaging portions toward and away from each other, arms on said jaws and extending from the pivotal mounting thereof oppositely to said socket-engaging portions, an extensible means operatively connected to said arms whereby extension and contraction of the extensible means swings the jaws between the coupling and uncoupling positions, means carried by said jaws and operatively responsive to extension and contraction of the extensible means to engage coacting means on said frame whereby to lock the jaws against retractive movement when the socket-engaging portions are engaged in the respective socket, and a connector on the frame positioned to interengage with the connector member on said one part when the socket-engaging portions are engaged in the sockets of said one cooperating part.

4. A coupling device comprising, cooperating parts for operatively connecting equipment devices with a vehicle wherein one of said cooperating parts is carried on a vehicle, one of said parts including a rigid structure having opposed sockets arranged in axial alignment and opening outwardly of said structure, a connector member fixed relative to said rigid structure between said sockets and vertically spaced from the axis thereof, the other of said cooperating parts including a frame, spaced jaws each having socket-engaging portions on an end thereof, means pivotally mounting said jaws on said frame in spaced relation to each other and with the socket-engaging portions extending therefrom toward said one cooperating part for swinging movement of said jaws to move the socket-engaging portions toward and away from each other, arms on said jaws and extending from the pivotal mounting thereof oppositely to said socket-engaging portions, links pivotally connected to said arms, an extensible means having ends pivotally connected to said links whereby extension and contraction of the extensible means swings the jaws between the coupling and uncoupling positions, cooperative means on said frame and said links engageable to frictionally lock the jaws against retractive movement when the socket-engaging portions are engaged in the respective sockets, and a connector on the frame positioned to interengage with the connector member on said one part when the socket-engaging portions are engaged in the sockets of said one cooperating part.

5. A coupling device comprising, two cooperating parts for operatively connecting equipment devices with a vehicle wherein one of said cooperating parts is carried on a vehicle at an end thereof, one of said cooperating parts including a rigid structure having opposed sockets arranged in axial alignment and opening outwardly of said structure, said axis of the sockets being transversely of the vehicle when in coupling position, the other of said cooperating parts including a frame, spaced jaws each having socket-engaging portions on an end thereof, means pivotally mounting said jaws on said frame in spaced relation transversely of the vehicle and with the socket-engaging portions extending therefrom toward said one cooperating part for swinging movement of said jaws to move the socket-engaging portions toward and away from each other, arms on said jaws and extending from the pivotal mounting thereof oppositely to said socket-engaging portions, links each having one end pivotally connected to the respective arms and extending toward the frame, an extensible means operatively connected to said links in spaced relation toward the frame from said pivotal mounting of the links with said arms whereby extension and contraction of the extensible means swings the jaws between coupling and uncoupling positions, stop means engageable by said links in response to contraction of the extensible means whereby the operative connections of the extensible means with said links are in a plane spaced toward the frame from the plane of the pivotal mountings of the links with said arms, and means on said frame engageable with said links in response to extension of extensible means swinging the links toward said frame in coupling position to frictionally lock the jaws in coupling position.

6. A coupling device comprising, two cooperating parts for operatively connecting equipment devices with a vehicle wherein one of said cooperating parts is carried on a vehicle at an end thereof, one of said cooperating parts including a rigid structure having opposed sockets arranged in axial alignment and opening outwardly of said structure, said axis of the sockets being transversely of the vehicle when in coupling position, a connector member fixed relative to said rigid structure between said sockets and spaced below the axis thereof, said connector member having an end extending from said rigid structure with a surface extending upwardly toward the rigid structure and terminating in a recess transversely thereof, the other of said cooperating parts including a frame, spaced jaws each having socket-engaging portions on an end threeof, means pivotally mounting said jaws on said frame in spaced relation transversely of the vehicle and with the socket-engaging portions extending therefrom toward said one cooperating part for swinging movement of said jaws to move the socket-engaging portions toward and away from each other, arms on said jaws and extending from the pivotal mounting thereof oppositely to said socket-engaging portions, links each having one end pivotally connected to the respective arms and extending toward the frame, an extensible means having ends operatively connected to said links in spaced relation toward the frame from said pivotal mounting of the links with said arms whereby extension and contraction of the extensible means swings the jaws between coupling and uncoupling positions, stop means engageable by said links in response to contraction of the extensible means whereby the operative connections of the extensible means with said links are in a plane spaced toward the frame from the plane of the pivotal mountings of the links with said arms, means on said frame engageable with said links in response to extension of extensible means swinging the links toward said frame in coupling position to frictionally lock the jaws in coupling position, a bifurcated connector pivotally mounted on the frame and positioned to receive the connector member of said one part when the socket-engaging portions are engaged in the sockets of said one cooperating part, said connector on the frame having a keeper removably engaged with the transverse recess in the connector member on said one cooperating part for holding said connector member and connector on the frame engaged, means biasing the connector on the frame to maintain the keeper in the recess, and means operatively connected to the connector on the frame for moving said connector to release the keeper thereof from the recess in the connector on said one cooperating part.

7. A coupling device comprising, two cooperating parts for operatively connecting equipment devices with a vehicle wherein one of said cooperating parts is carried on a vehicle at an end thereof, one of said cooperating parts including a rigid structure having opposed sockets arranged in axial alignment and opening outwardly of said structure, said axis of the sockets being transversely of the vehicle when in coupling position, a connector member fixed relative to said rigid structure between said sockets and spaced below the axis thereof, said connector member having an end extending from said rigid structure with a surface extending upwardly toward the rigid structure and terminating in a recess transversely thereof, the other of said cooperating parts including a frame, spaced jaws each having socket-engaging portions on an end thereof, means pivotally mounting said jaws on said frame in spaced relation transversely of the vehicle and with the socket-engaging portions extending therefrom toward said one cooperating part for swinging movement of said jaws to move the socket-engaging portions toward and away from each other, arms on said jaws and extending from the pivotal mounting thereof oppositely to said socket-engaging portions, links each having one end pivotally connected to the respective arms and extending toward the frame, an extensible means having ends pivotally connected to said links in spaced relation toward the frame from said pivotal mounting of the links with said arms whereby extension and contraction of the extensible means swings the jaws between coupling and uncoupling positions, stop means engageable by said links in response to contraction of the extensible means whereby the axes of the pivotal mountings of the ends of the extensible means with said links are in a plane spaced toward the frame from the plane of the pivotal mountings of the links with said arms, cooperative means on said frame and said links engageable to frictionally lock the jaws against retractive movement when the socket-engaging portions are engaged in the respective sockets, a bifurcated connector pivotally mounted on the frame and positioned to receive the connector member of said one part when the socket-engaging portions are engaged in the sockets of said one cooperating part, said connector on the frame having a keeper removably engaged with the transverse recess in the connector member on said one cooperating part for holding said connector member and connector on the frame engaged, means biasing the connector on the frame to maintain the keeper in the recess, and means operatively connecting the connector on the frame with one of the jaws for moving said connector on the frame in response to movement of said one of the jaws whereby movement of said jaws to uncoupling position swings said connector on the frame to release the keeper thereof from the recess in the connector on said one cooperating part.

8. A coupling device comprising, two cooperating parts for operatively connecting equipment devices with a vehicle wherein one of said cooperating parts is carried on a vehicle at an end thereof, one of said cooperating parts including a rigid structure having opposed sockets arranged in axial alignment and opening outwardly of said structure, said axis of the sockets being transversely of the vehicle when in coupling position, a connector member fixed relative to said rigid structure between said sockets and spaced below the axis thereof, said connector member having an end extending from said rigid structure with a surface extending upwardly toward the rigid structure and terminating in a recess transversely thereof, the other of said cooperating parts including a frame, spaced jaws each having socket-engaging portions on an end thereof, means pivotally mounting said jaws on said frame in spaced relation transversely of the vehicle and with the socket-engaging portions extending therefrom toward said one cooperating part for swinging movement of said jaws to move the socket-engaging portions toward and away from each other, arms on said jaws and extending from the pivotal mounting thereof oppositely to said socket-engaging portions, links each having one end pivotally connected to the respective arms and extending toward the frame, an extensible means having ends pivotally connected to said links in spaced relation toward the frame from said pivotal mounting of the links with said arms whereby extension and contraction of the extensible means swings the jaws between coupling and uncoupling positions, stop means engageable by said links in response to contraction of the extensible means whereby the axes of the pivotal mountings of the ends of the extensible means with said links are in a plane spaced toward the frame from the plane of the pivotal mountings of the links with said arms, means on said frame engageable with said links in response to extension of extensible means swinging the links toward said frame in coupling position to frictionally lock the jaws in coupling position, a bifurcated connector pivotally mounted on the frame and positioned to receive the connector member of said one part when the socket-engaging portions are engaged in the sockets of said one cooperating part, said connector on the frame having a keeper removably engaged with the transverse recess in the connector member on said one cooperating part for holding said connector member and connector on the frame engaged, means biasing the connector on the frame to maintain the keeper in the recess, and means operatively connecting the connector on the frame with one of the jaws for moving said connector on the frame in response to movement of said one of the jaws whereby movement of said jaws to uncoupling position swings said connector on the frame to release the keeper thereof from the recess in the connector on said one cooperating part.

9. A coupling device comprising, two cooperating parts for operatively connecting equipment devices with a vehicle wherein one of said cooperating parts is carried on a vehicle at an end thereof, one of said cooperating parts including a rigid structure having opposed sockets arranged in axial alignment and opening outwardly of said structure, said axis of the sockets being transversely of the vehicle when in coupling position, the other of said cooperating parts including a frame, spaced jaws each having socket-engaging portions on an end thereof, means pivotally mounting said jaws on said frame in spaced relation transversely of the vehicle and with the socket-engaging portions extending therefrom toward said one cooperating part for swinging movement of said jaws to move the socket-engaging portions toward and away from each other, arms on said jaws and extending from the pivotal mounting thereof oppositely to said socket-engaging portions, an extensible means operatively connected to said arms whereby extension and contraction of the extensible means swings the jaws between coupling and uncoupling positions, means carried by said jaws and operative in response to extension and contraction of the extensible means to engage coacting means on said frame whereby to lock the jaws against retractive movement when the socket-engaging portions are engaged with the respective sockets, means on said vehicle movably mounting said frame of the other cooperating part for up and down movement relative to said vehicle, and power means on the vehicle operatively connected with the mounting of said frame for effecting said up and down movement of said other cooperating part.

10. A coupling device comprising, two cooperating parts for operatively connecting equipment devices with a vehicle wherein one of said cooperating parts is carried on a vehicle at an end thereof, one of said cooperating parts including a rigid structure having opposed sockets arranged in axial alignment and opening outwardly of said structure, said axis of the sockets being transversely of the vehicle when in coupling position, the other of said cooperating parts including a frame, spaced jaws each having socket-engaging portions on an end thereof, means pivotally mounting said jaws on said frame in spaced relation transversely of the vehicle and with the socket-engaging portions extending therefrom toward said one cooperating part for swinging movement of said jaws to move the socket-engaging portions toward and away from each other, arms on said jaws and extending from the pivotal mounting thereof oppositely to said socket-engaging portions, links each having one end pivotally connected to the respective arms and extending toward the frame, an extensible means having ends pivotally connected to said links in spaced relation toward the frame from said pivotal mounting of the links with said arms whereby extension and contraction of the extensible means swings the jaws between coupling and uncoupling positions, stop means engageable by said links in response to contraction of the extensible means whereby the axes of the pivotal mountings of the ends of the extensible means with said links are in a plane spaced toward the frame from the plane of the pivotal mountings of the links with said arms, cooperative means on said frame and said links engageable to frictionally lock the jaws against retractive movement when the socket-engaging portions are engaged in the respective sockets, means on said vehicle movably mounting said frame of the other cooperating part for up and down movement relative to said vehicle, and power means on the vehicle operatively connected with the mounting of said frame for effecting said up and down movement of said other cooperating part.

11. A coupling device comprising, two cooperating parts for operatively connecting equipment devices with a vehicle wherein one of said cooperating parts is carried on a vehicle at an end thereof, one of said cooperating parts including a rigid structure having opposed sockets arranged in axial alignment and opening outwardly of said structure, said axis of the sockets being transversely of the vehicle when in coupling position, a connector member fixed relative to said rigid structure between said sockets and spaced below the axis thereof, said connector member having an end extending from said rigid structure with a surface extending upwardly toward the rigid structure and terminating in a transverse recess, the other of said cooperating parts including a frame, spaced jaws each having socket-engaging portions on an end thereof, means pivotally mounting said jaws on said frame in spaced relation transversely of the vehicle and with the socket-engaging portions extending therefrom toward said one cooperating part for swinging movement of said jaws to move the socket-engaging portions toward and away from each other, arms on said jaws and extending from the pivotal mounting thereof oppositely to said socket-engaging portions, links each having one end pivotally connected to the respective arms and extending toward the frame, an extensible means having ends pivotally connected to said links in spaced relation toward the frame from said pivotal mounting of the links with said arms whereby extension and contraction of the extensible means swings the jaws between coupling and uncoupling positions, stop means engageable by said links in response to contraction of the extensible means whereby the axes of the pivotal mountings of the ends of the extensible means with said links are in a plane spaced toward the frame from the plane of the pivotal mountings of the links with said arms, cooperative means on said frame and said links engageable to frictionally lock the jaws against retractive movement when the socket-engaging portions are engaged in the respective sockets, a bifurcated connector pivotally mounted on the frame and positioned to receive the connector member of said one part when the socket-engaging portions are engaged in the sockets of said one cooperating part, said connector on the frame having a keeper removably engaged with the transverse recess in the connector member on said one cooperating part for holding said connector member and connector on the frame engaged, means biasing the connector on the frame to maintain the keeper in the recess, means operatively connected to the connector on the frame for moving said connector on the frame to release the keeper thereof from the recess in the connector on said one cooperating part, means on said vehicle movably mounting said frame of the other cooperating part for up and down movement relative to said vehicle, and power means on the vehicle operatively connected with the mounting of said frame for effecting said up and down movement of said other cooperating part.

12. A coupling device comprising, two cooperating parts for operatively connecting equipment devices with a vehicle wherein one of said cooperating parts is carried on a vehicle at an end thereof, one of said cooperating parts including a rigid structure having opposed sockets arranged in axial alignment and opening outwardly of said structure, said axis of the sockets being transversely of the vehicle when in coupling position, a connector member fixed relative to said rigid structure between said sockets and spaced below the axis thereof, said connector member having an end extending from said rigid structure with a surface extending upwardly toward the rigid structure and terminating in a transverse recess, the other of said cooperating parts including a frame, spaced jaws each having socket-engaging portions on an end thereof, means pivotally mounting said jaws on said frame in spaced relation transversely of the vehicle and with the socket-engaging portions extending therefrom toward said one cooperating part for swinging movement of said jaws to move the socket-engaging portions toward and away from each other, arms on said jaws and extending from the pivotal mounting thereof oppositely to said socket-engaging portions, links each having one end pivotally connected to the respective arms and extending toward the frame, an extensible means having ends pivotally connected to said links in spaced relation toward the frame from said pivotal mounting of the links with said arms whereby extension and contraction of the extensible means swings the jaws between coupling and uncoupling positions, stop means engageable by said links in response to contraction of the extensible means whereby the axes of the pivotal mountings of the ends of the extensible means with said links are in a plane spaced toward the frame from the plane of the pivotal mountings of the links with said arms, means on said frame engageable with said links in response to extension of extensible means swinging the links toward said frame in coupling position to frictionally lock the jaws in coupling position, a bifurcated connector pivotally mounted on the frame and positioned to receive the connector member of said one part when the socket-engaging portions are engaged in the sockets of said one cooperating part, said connector on the frame having a keeper removably engaged with the transverse recess in the connector member on said one cooperating part for holding said connector member and connector on the frame engaged, means biasing the connector on the frame to maintain the keeper in the recess, means operatively connecting the connector on the frame with one of the jaws for moving said connector on the frame in response to movement of said one of the jaws whereby movement of said jaws to uncoupling position swings said connector on the frame to release the keeper thereof from the recess in the connector on said one cooperating part, means on said vehicle movably mounting said frame of the other cooperating part for up and down movement relative to said vehicle, and power means on the vehicle operatively connected with the mounting of said frame for effecting said up and down movement of said other cooperating part.

13. A coupling structure comprising, two cooperating parts for operatively connecting equipment devices with a vehicle, one of said cooperating parts being rigidly connected to an equipment device and including a rigid structure having opposed sockets arranged in axial alignment and opening outwardly of said structure, the axis of said sockets being positioned transversely of a vehicle when in coupling position, the other of said cooperating parts including a frame, means mounting the frame on an end of a vehicle, said frame extending transversely of said vehicle, an arm on each side of the frame, means pivotally mounting said arms on said frame whereby said arms swing about substantially vertical axes, said arms each having an end extending generally toward said one cooperating part, projections on said arms ends arranged to be extending one toward the other when the arms are swung to coupling position, said sockets in said one part having inwardly converging surfaces, said projections having corresponding converging surfaces adapted to engage the surfaces of the sockets whereby the projections will enter the respective socket and move same to effect alignment as they are moved to coupling position, said arms having other ends extending oppositely from the projections, links each having one end pivotally connected to said other ends of the arms with said links extending toward the frame, an extensible means having ends pivotally connected to said links and spaced toward the frame from the pivotal connection of the links with said arm ends whereby extension and contraction of the extensible means swings the links on the arms and moves the arms between coupling and uncoupling positions, stop means engageable by said links to limit swinging movement thereof in response to contraction of the extensible means whereby the pivotal connection of the ends of the extensible means with said links are in a plane spaced toward the frame from the pivotal connections of the links with said arm ends, and cooperative means on said frame and said links engageable to frictionally lock the arms against retractive movement of the projections when said projections are engaged in the respective sockets in coupling position.

14. A coupling structure comprising, two cooperating parts for operatively connecting equipment devices with a vehicle, one of said cooperating parts being rigidly connected to an equipment device and including a rigid structure having opposed sockets arranged in axial alignment and opening outwardly of said structure, the axis of said sockets being positioned transversely of a vehicle when in coupling position, a connector member fixed relative to said rigid structure and in downwardly spaced relation to the axis thereof, said connector member extending toward a vehicle to be coupled therewith and having an upper inclined surface terminating in a downwardly extending notch, the other of said cooperating parts including a frame, means mounting the frame on an end of a vehicle, said frame extending transversely of said vehicle, an arm on each side of the frame, means pivotally mounting said arms on said frame whereby said arms swing about substantially vertical axes, said arms each having an end extending generally toward said one cooperating part, projections on said arms ends arranged to be extending one toward the other when the arms are swung to coupling position, said sockets in said one part having inwardly converging surfaces, said projections having corresponding converging surfaces adapted to engage the surfaces of the sockets whereby the projections will enter the respective socket and move same to effect alignment as they are moved to coupling position, said arms having other ends extending oppositely from the projections, links each having one end pivotally connected to said other ends of the arms with said links extending toward the frame, an extensible means having ends pivotally connected to said links and spaced toward the frame from the pivotal connection of the links with said arm ends whereby extension and contraction of the extensible means swings the links on the arms and moves the arms between coupling and uncoupling positions, stop means engageable by said links to limit swinging movement thereof in response to contraction of the extensible means whereby the pivotal connections of the ends of the extensible means with said links are in a plane spaced toward the frame from the pivotal connections of the links with said arm ends, cooperative means on said frame and said links engageable to frictionally lock the arms against retractive movement when the projections are engaged in the respective sockets in coupling position, a connector member pivotally mounted on the frame and positioned to receive the connector member on said one cooperating part when the projections are engaged in the sockets, said connector member having a lock bar engageable in the notch of the connector member on said one cooperating part, and means operatively connecting said connector member on the frame with one of the arms whereby said connector member is swung to release the lock bar from the notch in response to swinging movement of the arm to uncoupled position, and stop means on the frame to limit downward swinging movement of the connector member on the frame whereby in movement to coupling position the connector member on the frame is in position to receive the connector member on said one cooperating part.

15. A coupling structure comprising, two cooperating parts for operatively connecting equipment devices with a vehicle, one of said cooperating parts being rigidly connected to an equipment device and including a rigid structure having opposed sockets arranged in axial alignment and opening outwardly of said structure, the axis of said sockets being positioned transversely of a vehicle when in coupling position, a connector member fixed relative to said rigid structure between said sockets and in downwardly spaced relation to the axis thereof, said connector member extending toward a vehicle to be coupled therewith and having an upper inclined surface terminating in a downwardly extending notch, the other of said cooperating parts including a frame, means mounting the frame on an end of a vehicle, said frame extending transversely of said vehicle, an arm on each side of the frame, means pivotally mounting said arms on said frame whereby said arms swing about substantially vertical axes, said arms each having an end extending generally toward said one cooperating part, projections on said arms ends arranged to be extending one toward the other when the arms are swung to coupling position, said sockets in said one part having inwardly converging surfaces, said projections having corresponding converging surfaces adapted to engage the surfaces of the sockets whereby the projections will enter the respective socket and move same to effect alignment as they are moved to coupling position, said arms having other ends extending oppositely from the projections, links each having one end pivotally connected to said other ends of the arms with said links extending toward the frame, an extensible means having ends pivotally connected to said links and spaced toward the frame from the pivotal connection of the links with said arm ends whereby extension and contraction of the extensible means swings the links on the arms and moves the arms between coupling and uncoupling positions, stop means engageable by said links to limit swinging movement thereof in response to contraction of the extensible means whereby the pivotal connection of the ends of the extensible means with said links are in a plane spaced toward the frame from the pivotal connections of the links with said arm ends, means on said frame engageable with said links, said means on said frame and said links having cooperating engageable surfaces to frictionally lock the arms in coupling position, a bifurcated connector member pivotally mounted on the frame and positioned to receive the connector member on said one cooperating part when the projections are engaged in the sockets, said bifurcated connector member having a lock bar engageable in the notch of the connector member on said one cooperating part, means biasing said bifurcated connector member to urge the lock bar into said notch, and means operatively connecting said bifurcated connector member with one of the arms whereby the bifurcated connector member is swung to release the lock bar from the notch in response to swinging movement of the arm to uncoupled position, and stop means on the frame to limit downward swinging movement of the bifurcated connector member whereby in movement to coupling position the bifurcated member is in position to receive the connector member on said one cooperating part.

16. A coupling structure comprising, two cooperating parts for operatively connecting equipment devices with a vehicle, one of said cooperating parts being rigidly connected to an equipment device and including a rigid structure having opposed sockets arranged in axial alignment and opening outwardly of said structure, the axis of said sockets being positioned transversely of a vehicle when in coupling position, the other of said cooperating parts including a frame, means mounting the frame on an end of a vehicle, said frame extending transversely of said vehicle, an arm on each side of the frame, means pivotally mounting said arms on said frame whereby said arms swing about substantially vertical axes, said arms each having an end extending generally toward said one cooperating part, projections on said arm ends arranged to be extending one toward the other when the arms are swung to coupling position, said sockets in said one part having inwardly converging surfaces, said projections having corresponding converging surfaces adapted to engage the surfaces of the sockets whereby the projections will enter the respective socket and move same to effect alignment as they are moved to coupling position, said arms having other ends extending oppositely from the projections, an extensible means operatively connected to said arms whereby extension and contraction of the extensible means swings the arms and projections thereon between the coupling and uncoupling positions, means carried by said arms and operatively responsive to extension and contraction of the extensible means to engage coacting means on said frame whereby to lock the arms against retractive movement of the projections when said projections are engaged in the respective sockets in coupled position, and means on one of the vehicle and equipment device operative to effect relative up and down movement of one of said cooperating parts with respect to the other.

17. A coupling structure comprising, two cooperating parts for operatively connecting equipment devices with a vehicle, one of said cooperating parts being rigidly connected to an equipment device and including a rigid structure having opposed sockets arranged in axial alignment and opening outwardly of said structure, the axis of said sockets being positioned transversely of a vehicle when in coupling position, the other of said cooperating parts including a frame, means mounting the frame on an end of a vehicle, said frame extending transversely of said vehicle, an arm on each side of the frame, means pivotally mounting said arms on said frame whereby said arms swing about substantially vertical axes, said arms each having an end extending generally toward said one cooperating part, projections on said arm ends arranged to be extending one toward the other when the arms are swung to coupling position, said sockets in said one part having inwardly converging surfaces, said projections having corresponding converging surfaces adapted to engage the surfaces of the sockets whereby the projections will enter the respective socket and move same to effect alignment as they are moved to coupling position, said arms having other ends extending oppositely from the projections, links each having one end pivotally connected to said other ends of the arms with said links extending toward the frame, an extensible means having ends pivotally connected to said links and spaced toward the frame from the pivotal connection of the links with said arm ends whereby extension and contraction of the extensible means swings the links on the arms and moves the arms between coupling and uncoupling positions, stop means engageable by said links to limit swinging movement thereof in response to contraction of the extensible means whereby the pivotal connection of the ends of the extensible means with said links are in a plane spaced toward the frame from the pivotal connections of the links with said arm ends, cooperative means on said frame and said links engageable to frictionally lock the arms against retractive movement of the projections when said projections are engaged in the respective sockets in coupling position, and means on one of the vehicle and equipment device operative to effect relative up and down movement of one of said cooperating parts with respect to the other.

18. A coupling structure comprising, two cooperating parts for operatively connecting equipment devices with a vehicle, one of said cooperating parts being rigidly connected to an equipment device and including a rigid structure having opposed sockets arranged in axial alignment and opening outwardly of said structure, the axis of said sockets being positioned transversely of a vehicle when in coupling position, a connector member fixed relative to said rigid structure between said sockets and in downwardly spaced relation to the axis thereof, said connector member extending toward a vehicle to be coupled therewith and having an upper inclined surface terminating in a downwardly extending notch, the other of said cooperating parts including a frame, means mounting the frame on an end of a vehicle, said frame extending transversely of said vehicle, an arm on each side of the frame, means pivotally mounting said arms on said frame whereby said arms swing about substantially vertical axes, said arms each having an end extending generally toward said one cooperating part, projections on said arm ends arranged to be extending one toward the other when the arms are swung to coupling position, said sockets in said one part having inwardly converging surfaces, said projections having corresponding converging surfaces adapted to engage the surfaces of the sockets whereby the projections will enter the respective socket and move same to effect alignment as they are moved to coupling position, said arms having other ends extending oppositely from the projections, links each having one end pivotally connected to said other ends of the arms with said links extending toward the frame, an extensible means having ends pivotally connected to said links and spaced toward the frame from the pivotal connection of the links with said arm ends whereby extension and contraction of the extensible means swings the links on the arms and moves the arms between coupling and uncoupling positions, stop means engageable by said links to limit swinging movement thereof in response to contraction of the extensible means whereby the pivotal connection of the ends of the extensible means with said links are in a plane spaced toward the frame from the pivotal connections of the links with said arm ends, means on said frame engageable with said links, said means on said frame and said links having cooperating engageable surfaces to frictionally lock the arms in coupling position, a bifurcated connector member pivotally mounted on the frame and positioned to receive the connector member on said one cooperating part when the projections are engaged in the sockets, said bifurcated connector member having a lock bar engageable in the notch of the connector member on said one cooperating part, means biasing said bifurcated connector member to urge the lock bar into said notch, and means operatively connecting said bifurcated connector member with one of the arms whereby the bifurcated connector member is swung to release the lock bar from the notch in response to swinging movement of the arm to uncoupled position, stop means on the frame to limit downward swinging movement of the bifurcated connector member whereby in movement to coupling position the bifurcated member is in position to receive the connector member on said one cooperating part, and means on one of the vehicle and equipment device operative to effect relative up and down movement of one of said cooperating parts with respect to the other.

No references cited.